Nov. 10, 1931.  F. J. KUBLER  1,831,455
HANGING DOOR
Original Filed Oct. 23, 1928
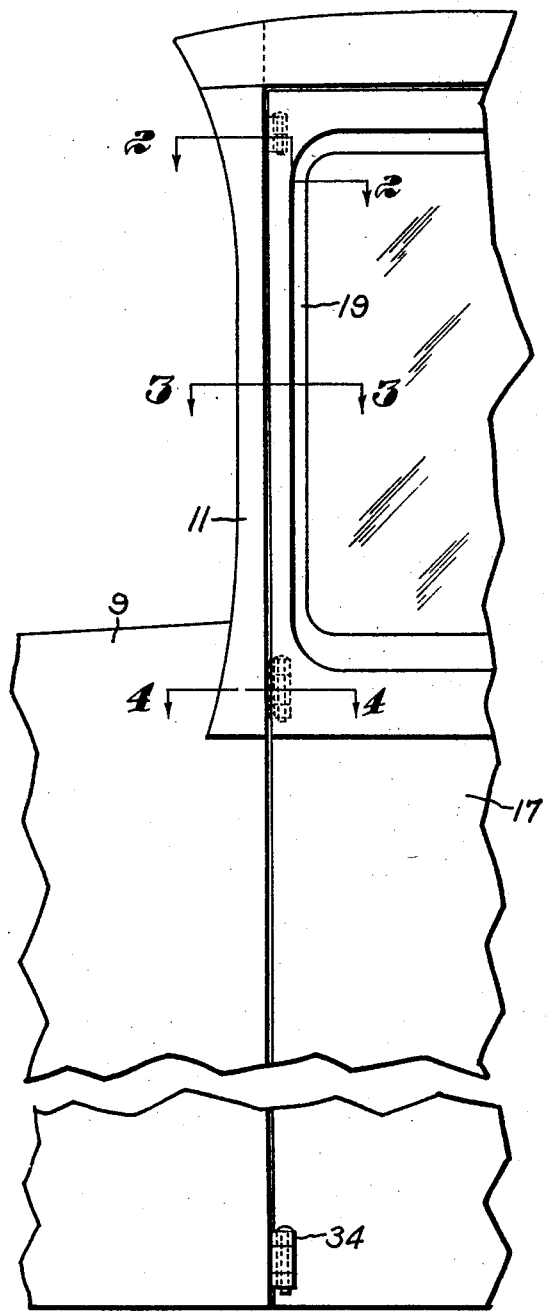
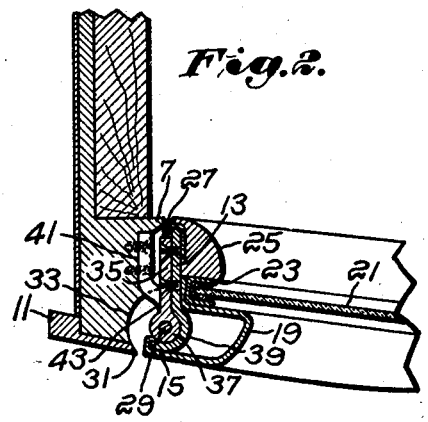
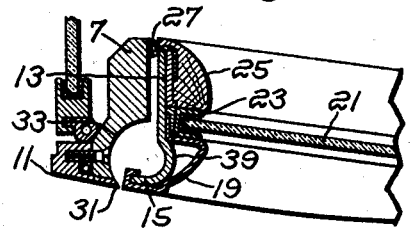
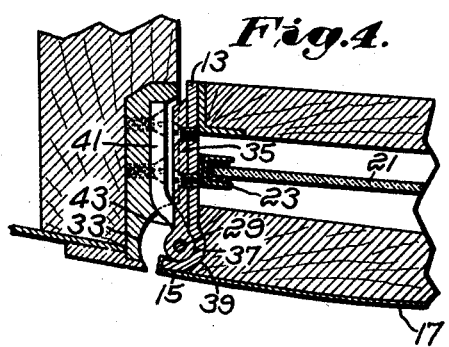
Inventor:
Frederick J. Kubler,
by Emery, Booth, Janney & Varney
Attys.

Patented Nov. 10, 1931

1,831,455

UNITED STATES PATENT OFFICE

FREDERICK J. KUBLER, OF NEW YORK, N. Y., ASSIGNOR TO A. S. CAMPBELL COMPANY, OF EAST BOSTON, MASSACHUSETTS, A CORPORATION OF MASSACHUSETTS

HANGING DOOR

Application filed October 23, 1928, Serial No. 314,482. Renewed May 11, 1931.

This invention relates to the hanging of doors, more particularly those of bodies of automotive vehicles of the closed type. The object is to provide an improved construction having various advantages, some of which will appear as the description proceeds, and in which the hinging means, at least in the region above the turn-under of the vehicle, is concealed.

My invention will be well understood by reference to the following description of an illustrative embodiment thereof shown by way of example in the accompanying drawings, wherein:

Fig. 1 is a broken side elevation of the forward corner of a closed automobile body; and Figs. 2, 3 and 4 are sections on the correspondingly numbered lines of Fig. 1, the line 3—3 being substantially at the elevation of the eyes of the driver, that is, in the plane of vision.

While not limited thereto, my invention finds particular application to vehicles in which the body hinge pillar and the door hinge pillar are of small dimensions, especially those of the type described in the patent to Emond No. 1,622,098, dated March 22, 1927, wherein the assembly at the forward corner of the vehicle, comprising the body pillar, the adjacent door pillar and the windshield frame, is organized to present an obstruction less in width than the distance between the eyes. In a structure of this kind I provide for utilizing concealed hinge members of ample size and in this comparable to those with exteriorly exposed pivots as now commonly used on closed vehicles.

In the embodiment of the invention shown by way of example the door is hung on a body pillar comprising a forged member 7 incorporated with the framework of the vehicle below the belt and arising adjacent the cowl 9, the exterior contour of this pillar in the present instance being completed by a detachably secured die casting 11. The door hinge pillar or rail cooperating therewith is here shown as formed of sheet metal and has a portion 13 of web section consisting of substantialy a single thickness of the sheet metal disposed in the plane of the jamb of the door and cooperating with the opposed surface of the body pillar 7 to form a door joint. This web member 13 is at the exterior flanged outwardly at 15 to provide an overlap flange about which is clinched the edge of the exterior sheet metal panel 17, a portion of which in the upper half of the door forms a molding 19 outlining the window opening which is closed by the glazing 21 sliding vertically in the glass run 23 disposed closely adjacent the inner face of the member 13. An interior molding 25 may serve to secure a windlace 27 as shown and described in my co-pending application Serial No. 294,988, which windlace is compressed between the door hinge pillar 13 and the rear face of the body pillar 7.

The door is mounted to swing on pintles 29 about a hinge axis inward of the exterior surface thereof as defined by the panel 17 and overlapped and concealed by the flange 15 which opposes with a suitable clearance the rear exterior edge 31 of the body pillar 7, the rear face of which is recessed at 33 from this point to pass the flange 15 in the opening movement of the door.

The hinging means herein shown comprise hinge members of relatively restricted depth located in spaced locations, one adjacent the top of the door and one adjacent the belt line of the vehicle. A lower hinge 34 may be utilized and when this is in the location of the turn-under of the vehicle it may project outwardly beyond the surface thereof and in this case is not of the concealed type. My invention more particularly relates to the construction of hinging means in the upper portion of the body where the problems of organizing elements of desired strength within desired restricted dimensions are particularly acute. A description of one of the hinges, as shown, for example, in Fig. 4, will make the construction clear.

The hinges herein shown are of the butt type comprising leaves for attachment to the opposed faces of the body pillar or jamb and the door pillar or rail, the attaching portions of the leaves lying (in the closed position of the door) in substantially parallel planes. A leaf 35 may be secured flatwise against the outer face of the web section 13 of the door pillar and is provided with a suitable knuckle or knuckles 37 for supporting the pivot pin or pintle substantially in the plane of said leaf 35. The knuckles may be of greater width than said leaf, and to accommodate them the metal of the door pillar may be inwardly depressed at 39 to accommodate the swell of the knuckles. This depression may be made either at the location of the hinge or continuously along the side of the pillar and the corresponding protrusion of the metal at the inner side may be located as shown in the space bounded by the exterior face of the molding 19 or its continuation or projection, the protrusion in the case of a hollow sheet metal molding as shown entering into said hollow.

To support the pivot of the hinge from the jamb or body pillar I have herein shown a cooperating member also in the form of a leaf or butt and having a distal portion 41 remote from the pivot which may be received in a suitable mortise in the pillar 7. Between the ends and substantially at the location of the interior of the boundary of the recess 33 said leaf is offset and extends inwardly toward the opposed door pillar and into the plane of leaf 35, considering the door in its closed position as shown, and the proximal portion 43 extends in this plane and is provided with a cooperating knuckle for supporting the pivot pin or pintle 29. As seen from Fig. 4, the offset defines a neck into which the flange 15 turns as the door opens.

In automotive vehicles as usually constructed the sides are not parallel to the center line of the vehicle but curve in a "side sweep" as shown, for example, in Figs. 2, 3 and 4, the center line being horizontal in the drawings. At the same time it is desirable that the door should open to a position at right angles to the side of the body and the door stop is so adjusted. In the usual hinge of the butt or barrel type the surfaces of the leaves lie in a plane substantially tangent to the circles of the knuckles so that about 180° is exposed as a circle. In the hinge shown the circle extends around on the side toward the interior of the vehicle to the location of the proximal portion 43 due to the offsetting of this portion relative to the distal portion 41. The offset or neck thus provided permits movement of the flange 15 without its coming into contact with the leaf although, due to the side sweep, when the door is open 90° the flange may move past the perpendicular to the center line, that is, past a vertical line in Figs. 2, 3 and 4.

In a construction such as described the hinges may be made of metal of ample thickness providing a firm and strong support for the door without either unduly increasing the thickness or size of the pillars to which they are attached or, on the other hand, without unduly cutting away or weakening such pillars. On account of the size and strength of such hinges separate hinges of restricted width may be used if desired, facilitating the hanging and unhanging of the door by attachment of the leaves in position and insertion of the pivot pins or pintles.

In the present description and the accompanying claims I have attempted to use the words "interior" and "exterior" with reference to the vehicle as a whole, and the words "inner" and "outer" with reference to the door as a structure in itself.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

Claims:

1. In a structure of the kind described, a sheet metal door hinge pillar having a portion of web section defining the edge of the door and a molding at the exterior face of the door, said portion being shaped in the region bounded by the exterior surface of said molding to provide a knuckle-receiving recess, a hinge leaf secured to the face of said web having a knuckle received in said recess, the door having a flange exteriorly overlying said knuckle, and a cooperating pivot supporting member offset between the pivot and its distal end and having its distal portion secured to the jamb.

2. In a structure of the kind described, a sheet metal door hinge pillar having a portion of web section defining the edge of the door and a molding at the exterior face of the door, said portion in the region bounded by the exterior surface of said molding being shaped to provide a knuckle-receiving recess, a hinge leaf secured to the face of said web having a knuckle received in said recess, the door having a flange exteriorly overlying said knuckle, a jamb having an exterior recess in which said flange may swing and an interior portion cooperating with said web-section portion to provide a door joint and a hinge leaf mortised into said interior portion and having a part offset from said recess and provided with hinge-pivot supporting means to cooperate with said knuckle.

3. In a structure of the class described in combination with the body hinge pillar, a sheet metal door hinge pillar having a web section of substantially a single thickness of metal disposed in the plane of the jamb of the door and having an exterior outwardly directed flange, a glass run closely adjacent the inner face of said section, a hinge leaf secured to said section and having a knuckle defining an axis inward of said flange, said section being depressed inwardly at a location exterior to said glass run to accommodate the knuckle, said body hinge pillar being exteriorly recessed to pass said flange, and a pivot supporting member attached to the body pillar and extending angularly therefrom at a point interior to the recess towards the door pillar and thence substantially in the plane of the door joint to the hinge axis.

4. In a vehicle in combination with a door casing including a body hinge pillar, a door closing within the casing having a door hinge pillar opposing the body pillar to provide a door joint, said door having an overlap flange extending over the door joint and the body pillar being recessed on its inner exterior edge to receive said flange in the turning movement of the door, and hinging means for hanging the door to turn about an axis interiorly of said flange comprising a leaf secured to the door pillar and formed with hinge knuckles substantially coplanar with the leaf and a leaf having cooperating knuckles and a portion proximal thereto likewise substantially in said plane and with the first leaf defining a neck into which said flange may enter and at the distal end of the neck being angularly directed and terminating in a distal portion secured to said jamb.

5. In a vehicle in combination with a door casing including a body hinge pillar, a door closing within the casing having a door hinge pillar opposing the body pillar to provide a door joint, said door having an overlap flange extending over the door joint and the body pillar being recessed on its inner exterior edge to receive said flange in the turning movement of the door, and hinging means for hanging the door to turn about an axis interiorly of said flange comprising a leaf secured to the outer face of the door pillar and having hinge knuckles defining an axis substantially coplanar with the leaf, the pillar being recessed to accommodate the swell of said knuckles and a leaf having cooperating knuckles and a portion proximal thereto likewise substantially in said plane and with the first leaf defining a neck into which said flange may enter and at the distal end of the neck being angularly directed and terminating in a distal portion secured to said jamb.

6. In a vehicle in combination with a door casing including a body hinge pillar, a door closing within the casing having a door hinge pillar opposing the body pillar to provide a door joint, said door having an overlap flange extending over the door joint and the body pillar being recessed on its inner exterior edge to receive said flange in the turning movement of the door, and hinging means for hanging the door to turn about an axis interiorly of said flange comprising hinge knuckles carried by the door pillar to define a hinge axis interiorly of said flange, and a hinge leaf having a securing portion mortised into the body pillar and extending thence angularly substantially to the plane and passing through said knuckles parallel to the jamb face of the door pillar and terminating in a cooperating knuckle.

7. In a vehicle a side-swept surface out of parallel with the center line of the vehicle provided with a door casing including a body hinge pillar and a door closing within the casing and adapted to open to a position at right angles to the side of the body, said door having a door hinge pillar opposing the body pillar to provide a door joint, said door having an overlap flange extending over the door joint and the body pillar being recessed on its inner exterior edge to receive said flange in the turning movement of the door and hinging means for hanging the door to turn about an axis interiorly of said flange comprising a hinge of the butt or barrel type comprising leaves having cooperating hinge knuckles located interiorly of said flange, one leaf being secured to the door hinge pillar, the circle of outer surfaces of the knuckles at the jamb side continuing around at the interior to the proximal portion of the other leaf, said leaf having an offset distal portion secured to the body pillar, said proximal portion providing a clearance into which said flange of the door may turn, the flange in the open position of the door extending interiorly beyond a line drawn through the hinge axis parallel to the center line of the vehicle.

In testimony whereof, I have signed my name to this specification.

FREDERICK J. KUBLER.

CERTIFICATE OF CORRECTION.

Patent No. 1,831,455. Granted November 10, 1931, to

FREDERICK J. KUBLER.

It is hereby certified that error appears in the printed specification of the above numbered patent requiring correction as follows: Page 3, line 68, claim 6, before the word "passing" strike out the word and; and that the said Letters Patent should be read with this correction therein that the same may conform to the record of the case in the Patent Office.

Signed and sealed this 22nd day of December, A. D. 1931.

(Seal)

M. J. Moore,
Acting Commissioner of Patents.